United States Patent
Nakaishi et al.

(10) Patent No.: US 9,172,069 B2
(45) Date of Patent: Oct. 27, 2015

(54) BATTERY SEALING STRUCTURE, ELECTROLYTE CIRCULATION TYPE BATTERY CELL FRAME, ELECTROLYTE CIRCULATION TYPE BATTERY CELL STACK, AND ELECTROLYTE CIRCULATION TYPE BATTERY

(75) Inventors: Hiroyuki Nakaishi, Osaka (JP); Yasumitsu Tsutsui, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 198 days.

(21) Appl. No.: 13/982,900

(22) PCT Filed: Mar. 30, 2012

(86) PCT No.: PCT/JP2012/058537
§ 371 (c)(1),
(2), (4) Date: Jul. 31, 2013

(87) PCT Pub. No.: WO2012/133747
PCT Pub. Date: Oct. 4, 2012

(65) Prior Publication Data
US 2013/0309540 A1 Nov. 21, 2013

(30) Foreign Application Priority Data

Mar. 31, 2011 (JP) .................. 2011-077017
Mar. 14, 2012 (JP) .................. 2012-057244

(51) Int. Cl.
*H01M 2/10* (2006.01)
*H01M 2/08* (2006.01)
(Continued)

(52) U.S. Cl.
CPC *H01M 2/08* (2013.01); *H01M 2/10* (2013.01); *H01M 8/0276* (2013.01);
(Continued)

(58) Field of Classification Search
CPC ....... H01M 2/08; H01M 2/10; H01M 8/0276; H01M 8/188

USPC ........................................... 429/99
See application file for complete search history.

(56) References Cited

U.S. PATENT DOCUMENTS 5,332,633 A 7/1994 Adamson et al.
5,411,818 A * 5/1995 Barlow et al. ............. 429/185
(Continued)

FOREIGN PATENT DOCUMENTS

EP 2693087 A1 2/2014
JP H03107674 A 5/1991
(Continued)

OTHER PUBLICATIONS

European Search Report corresponding European Patent Application No. 12765610.6, dated Nov. 26, 2014, 5 pages.
(Continued)

*Primary Examiner* — Jonathan Jelsma
(74) *Attorney, Agent, or Firm* — Ditthavong & Steiner, P.C.

(57) ABSTRACT

An easy-to-assemble battery sealing structure is provided. A cell frame includes a battery plate-like member (bipolar plate), a pair of frames for holding a peripheral portion of bipolar plate therebetween and pressing the peripheral portion from the front and the rear, and an annular packing made of an elastic material. Frames are provided with an annular groove between respective surfaces of the frames facing each other, for accommodating the peripheral portion of bipolar plate. Packing is mounted on the peripheral portion of bipolar plate, arranged in annular groove, and press-contacted between frames and the peripheral portion of bipolar plate. Packing includes a pair of legs for holding the peripheral portion of bipolar plate therebetween, and a base connecting legs together.

7 Claims, 8 Drawing Sheets

(51) Int. Cl.
  *H01M 8/24*   (2006.01)
  *H01M 8/02*   (2006.01)
  *H01M 8/18*   (2006.01)
  *H01M 8/20*   (2006.01)

(52) U.S. Cl.
  CPC ......... *H01M 8/0297* (2013.01); *H01M 8/2455* (2013.01); *H01M 8/188* (2013.01); *H01M 8/20* (2013.01); *Y02E 60/50* (2013.01)

(56) References Cited

U.S. PATENT DOCUMENTS

| | | | |
|---|---|---|---|
| 6,838,207 | B1 | 1/2005 | Sugita |
| 2004/0170893 | A1 | 9/2004 | Nakaishi et al. |
| 2004/0241544 | A1 | 12/2004 | Nakaishi et al. |
| 2007/0264557 | A1* | 11/2007 | Kobayashi et al. ............ 429/36 |

FOREIGN PATENT DOCUMENTS

| | | |
|---|---|---|
| JP | 07135008 A | 5/1995 |
| JP | 2001155758 A | 6/2001 |
| JP | 2001189156 A | 7/2001 |
| JP | 2002367659 A | 12/2002 |
| JP | 2002367660 A | 12/2002 |
| JP | 2004311254 A | 11/2004 |
| JP | 2010198818 A | 9/2010 |
| TW | 241402 B | 2/1995 |
| TW | 447157 B | 7/2001 |
| TW | I247445 B | 1/2006 |
| TW | I318016 B | 12/2009 |

OTHER PUBLICATIONS

International Search Report for PCT/JP2012/058537 mailed May 1, 2012.
Taiwanese Office Action for related Taiwanese Patent Application No. 101111420 dated Jun. 4, 2015, 7 pages.

* cited by examiner (A)

(B)

20:21, 22

130: 131, 132

BATTERY SEALING STRUCTURE, ELECTROLYTE CIRCULATION TYPE BATTERY CELL FRAME, ELECTROLYTE CIRCULATION TYPE BATTERY CELL STACK, AND ELECTROLYTE CIRCULATION TYPE BATTERY

TECHNICAL FIELD

The present invention relates to an easy-to-assemble battery sealing structure, and an electrolyte circulation type battery cell frame, an electrolyte circulation type battery cell stack and an electrolyte circulation type battery including this battery sealing structure.

BACKGROUND ART

An electrolyte circulation type battery such as a redox flow battery is one of large-capacity storage batteries. In a redox flow battery, a positive electrolyte and a negative electrolyte are supplied to a cell having a membrane and a positive electrode and a negative electrode facing each other with the membrane interposed therebetween, to charge and discharge the battery. For the electrolytes, an aqueous solution containing a metal ion whose valence varies by oxidation-reduction is commonly used. As the redox flow batteries, for example, an iron-chromium-based redox flow battery using an iron ion aqueous solution for the positive electrolyte and a chromium ion aqueous solution for the negative electrolyte, and a vanadium-based redox flow battery using a vanadium ion aqueous solution for the positive and negative electrolytes are well-known (see e.g., Patent Documents 1 to 3).

FIG. 8 is a schematic diagram for illustrating an electrolyte circulation type battery (redox flow battery). A redox flow battery 100 includes a cell 110. Cell 110 is partitioned into a positive electrode cell 112 and a negative electrode cell 113 by a membrane 111 through which ions can pass. Positive electrode cell 112 contains a positive electrode 114, and negative electrode cell 113 contains a negative electrode 115. Redox flow battery 100 further includes, for each of the positive electrode and the negative electrode, an electrolyte tank 120 for storing the electrolyte, a circulation path 130 for circulating the electrolyte between electrolyte tank 120 and battery cell 110 (positive electrode cell 112, negative electrode cell 113), and a circulation pump 140 for circulating the electrolyte through circulation path 130. Circulation path 130 includes a go conduit pipe 131 for feeding the electrolyte from electrolyte tank 120 to battery cell 110 (positive electrode cell 112, negative electrode cell 113), and a return conduit pipe 132 for feeding the electrolyte from battery cell 110 (positive electrode cell 112, negative electrode cell 113) back to electrolyte tank 120. In redox flow battery 100 shown in FIG. 8, a vanadium ion aqueous solution is used by way of example for the positive and negative electrolytes. In FIG. 8, solid line arrows in the battery cell indicate charge reaction, and broken line arrows indicate discharge reaction.

A cell of a redox flow battery is commonly utilized in a form referred to as a cell stack. The cell stack includes a plurality of stacked cells, each cell including a membrane, and a positive electrode and a negative electrode facing each other with the membrane interposed therebetween. FIG. 9 is a schematic diagram for illustrating the cell stack. A cell stack 200 employs a cell frame 210 including a bipolar plate 211 and a frame 212 for fixing bipolar plate 211. Cell stack 200 includes a plurality of cells stacked with cell frames 210 interposed therebetween, each cell including positive electrode 114, membrane 111 and negative electrode 115 stacked on one another. That is, one cell is formed between cell frames 210 (bipolar plates 211), and in the space between cell frames 210 (frames 212), a negative electrode (negative electrode cell) and a positive electrode (positive electrode cell) of adjacent cells are arranged on front and rear sides with bipolar plate 211 interposed therebetween. In order to supply and discharge the electrolyte to and from each electrode, frame 212 of cell frame 210 is provided with liquid supply manifolds 213, 214 and liquid discharge manifolds 215, 216 through the front and rear surfaces, and guide grooves formed alternately between the front and rear surfaces to guide the electrolyte from each manifold to each electrode. In some cases, a protection plate made of plastic (not shown) is arranged to cover the guide grooves to prevent direct contact between the guide grooves and membrane 111, thus reducing the likelihood of breakage of membrane 111 after the stacking. Then, a pair of end plates 220 is arranged on opposite sides of the stacked body including the plurality of cells stacked with cell frames 210 interposed therebetween, each cell including positive electrode 114, membrane 111 and negative electrode 115, and both end plates 220 are clamped in a stacking direction of the stacked body by a clamping mechanism 230 such as bolts, to form cell stack 200 (e.g., paragraphs 0004 to 0005, FIG. 9 in Patent Document 1).

For the cell frame described above, a bipolar plate made of plastic carbon (e.g., graphite-containing resin) and a frame made of plastic (e.g., vinyl chloride) are often used. This cell frame is usually assembled by holding a peripheral portion of the bipolar plate between a pair of frames, and integrating the frames and the bipolar plate together by adhesion with an organic solvent (e.g., paragraph 0028 in Patent Document 3). In this case, the pair of frames constitutes the frame. By the adhesion between the frames and the bipolar plate with an organic solvent, a sealing structure is formed that seals a space isolated by the bipolar plate between the frames.

CITATION LIST

Patent Documents

PTD 1: Japanese Patent Laying-Open No. 2002-367659
PTD 2: Japanese Patent Laying-Open No. 2002-367660
PTD 3: Japanese Patent Laying-Open No. 2001-189156

SUMMARY OF INVENTION

Technical Problem

In the conventional technique described above, the sealing structure for providing sealing between the pair of frames and the peripheral portion of the battery plate-like member (bipolar plate) is formed by adhesion with an organic solvent. The conventional battery sealing structure, however, suffers from the following problems.

The adhesion operation depends on the skills of an operator, and thus the quality tends to vary, which is problematic in terms of assembling workability.

Furthermore, in a battery sealing structure formed by adhesion between a pair of frames and a peripheral portion of a battery plate-like member with an organic solvent, stress concentration tends to occur in a border portion between the frames and the battery plate-like member, thus raising the possibility of internal damage.

The present invention has been made in view of the situations described above, and an object of the present invention is to provide an easy-to-assemble battery sealing structure. Another object of the present invention is to provide an electrolyte circulation type battery cell frame, an electrolyte circulation type battery cell stack and an electrolyte circulation type battery including this battery sealing structure.

Solution to Problem

The present invention solves the aforementioned problems by using an annular packing made of an elastic material, the packing including a pair of legs for holding a peripheral portion of a battery plate-like member therebetween, and a base connecting the legs together at an outer edge of the battery plate-like member.

A battery sealing structure of the present invention includes a battery plate-like member and a pair of frames for holding a peripheral portion of the battery plate-like member therebetween, for sealing a space between the frames. The pair of frames is pressed from the front and the rear. The pair of frames is provided with an annular groove between respective surfaces of the frames facing each other in a pressing direction, for accommodating the peripheral portion of the battery plate-like member. The battery sealing structure includes an annular packing made of an elastic material, the packing being arranged in the annular groove and press-contacted between the pair of frames and the peripheral portion of the battery plate-like member. The packing includes a pair of legs for holding the peripheral portion of the battery plate-like member therebetween, and a base connecting the legs together at an outer edge of the battery plate-like member.

According to this structure, the peripheral portion of the battery plate-like member is held between the pair of frames and the pair of frames is pressed from the front and the rear, to integrate the frames and the battery plate-like member together. Therefore, the battery sealing structure does not need adhesion operation, does not depend on the skills of an operator, and is thus easy to assemble. In addition, by providing the annular packing made of an elastic material, the packing is deformed by being press-contacted between the pair of frames and the peripheral portion of the battery plate-like member to come in close contact with them, thus ensuring high sealing capability. Furthermore, since the packing includes the pair of legs and the base connecting the legs together, the packing can be mounted with easy operation of spreading the packing and fitting it on the peripheral portion of the battery plate-like member, and can be reliably mounted without being displaced or detached.

Here, if the packing has a substantially V-shape in cross section and is formed such that the spacing between the tips of the pair of legs extending from the base is greater than the spacing between roots of the legs (namely, the thickness of the peripheral portion of the battery plate-like member), the peripheral portion of the battery plate-like member can be readily held between the legs during the mounting of the packing on the peripheral portion of the battery plate-like member, thus facilitating the operation of fitting the packing. For example, before the mounting on the peripheral portion of the battery plate-like member, the spacing between the tips of the legs is preferably twice or more than twice, more preferably three times or more than three times the thickness of the peripheral portion of the battery plate-like member.

Since the packing is made of an elastic material, if the battery plate-like member is deformed by expansion or contraction, the packing follows the battery plate-like member and expands or contracts. Moreover, if the battery plate-like member is deformed or subjected to stress with the circulation of an electrolyte as in an electrolyte circulation type battery, for example, the packing follows the battery plate-like member and provides the effect of alleviating the stress. Thus, damage to the frames or the battery plate-like member can be prevented. Therefore, a wide range of options for a material for the battery plate-like member is provided without limitation.

Examples of the elastic material used for the packing include rubbers such as ethylene-propylene-diene rubber (EPDM), fluorine-containing rubber and silicone rubber, which may be selected as appropriate depending on the application. If the battery sealing structure of the present invention is applied to the cell frame of the electrolyte circulation type battery (redox flow battery) described above, for example, it is preferable to select EPDM or fluorine-containing rubber which are highly resistant to electrolyte.

In one embodiment of the battery sealing structure of the present invention, at least one of the legs of the packing includes a projection on one or both of an outer surface facing the frames and an inner surface facing the battery plate-like member.

The legs are press-contacted between the frames and the battery plate-like member. According to this structure, since the leg has the projection, the projection is squeezed and deformed by compression during the press-contact, thereby enhancing the sealing capability. More specifically, when the battery sealing structure is employed, the projection is deformed by compression to generate a contact pressure in a portion in contact with the frames and the battery plate-like member, thereby producing a high sealing function. The dimensions of the legs and the number of projections are not particularly limited but may be set as appropriate. If the battery sealing structure of the present invention is applied to the cell frame of the electrolyte circulation type battery (redox flow battery) described above, for example, each leg has a thickness (distance from its outer surface to its inner surface) of 0.2 mm to 0.5 mm and a width (distance from its tip to its base) of 1.0 mm to 10 mm in a non-compressed state. Projections are provided at intervals in a circumferential direction of the annular packing One to five projections are provided on one surface of a leg, and they have a height of 0.1 mm to 0.5 mm in a non-compressed state. For a packing having a projection on its leg, an amount of compression (rate of squeeze) of the projection determines a contact pressure. The higher the amount of compression, the higher the contact surface. By setting the height of the projection within the aforementioned range, a sufficient contact pressure can be ensured to enhance the sealing capability, and damage to and deformation of the frames or the battery plate-like member due to the generation of an excessive contact surface can be suppressed. If a plurality of projections are provided, more contact portions with the frames or the battery plate-like member are provided in a width direction of the legs, thereby enhancing the reliability of the sealing capability. The projection of the leg serves as a rib for reinforcing the packing (leg), and also has a shape-retaining function.

Here, a projection may be provided on at least one of the pair of legs, and may be provided on both or one of the legs. In addition, a projection may be provided on at least one of an outer surface and an inner surface of one of the legs, and may be provided on both or one of the surfaces. For example, a projection may be provided on the outer surface of one of the legs and a projection may be provided on the inner surface of the other leg, or a projection may be provided on only one of the outer surface and the inner surface of both legs. If a projection is provided on both the outer and inner surfaces of one of the legs, the projections may be provided in different positions between the outer surface and the inner surface in the width direction of the legs, or may be provided in the same positions in the width direction of the legs. If a projection is provided on both legs, the projections may be provided in different positions between one of the legs and the other leg, or may be provided in the same positions.

In one embodiment of the battery sealing structure of the present invention, at least one of the legs of the packing includes a root portion extending linearly from the base, and at least one bent portion formed between this root portion and a tip.

The legs are press-contacted between the frames and the battery plate-like member. According to this structure, since the leg has the bent portion, the bent portion is spread from a bent state and elastically deformed into a flat shape during the press-contact, thereby enhancing the sealing capability. More specifically, when the battery sealing structure is employed, the bent portion is elastically deformed to generate a contact pressure in a portion in contact with the frames and the battery plate-like member, thereby producing a high sealing function. The dimensions and shape of the bent portion and the number of bent portions are not particularly limited but may be set as appropriate. If the battery sealing structure of the present invention is applied to the cell frame of the electrolyte circulation type battery (redox flow battery) described above, for example, each leg has a thickness (distance from its outer surface to its inner surface) of 0.2 mm to 0.5 mm and a width (distance from its tip to its base) of 1.0 mm to 10 mm in a non-compressed state. Bent portions are provided at intervals in a circumferential direction of the annular packing One to five bent portions are provided, and they have a bend angle of 80° to 150° and a bend height of 0.3 mm to 3 mm in a non-compressed state. The bent portion may have a V-shape or U-shape (arc shape, arcuate shape), or a plurality of bent portions may be formed into a corrugated shape. If a plurality of bent portions are provided, more contact portions with the frames or the battery plate-like member are provided in the width direction of the legs, thereby enhancing the reliability of the sealing capability.

The bend angle of the bent portion as used herein refers to an angle formed between two sides (surfaces) forming the bent portion. If the bend angle is too small, there is a risk of buckling of the bent portion during the press-contact. If the bend angle is too great, on the other hand, the legs need to have a large width when the bend height is constant, causing a risk that the tips of the legs will project from the annular groove during the press-contact. The bend height of the bent portion refers to a distance from the inner surface facing the battery plate-like member at the root portion to the apex of the bent portion, if the bent portion has an outwardly convex shape facing the frames relative to the root portion, and refers to a distance from the outer surface at the root portion to the apex of the bent portion, if the bent portion has an inwardly convex shape. For a packing having a bent portion on its leg, an amount of compression of the bent portion (amount of deformation of the bend height) determines a contact pressure. The higher the amount of compression, the higher the contact surface. By setting the bend height of the bent portion within the aforementioned range, a sufficient contact pressure can be ensured to enhance the sealing capability. If the bend height is too great, the legs have a larger width, causing a risk that the tips of the legs will project from the annular groove during the press-contact.

The bent portion satisfies the following conditions.

(1) The bent portion is formed of a first side portion continuous with the root portion and inclined relative to the root portion, and a second side portion continuous with the first side portion and inclined relative to the first side portion.

(2) The tip of the second side portion extends at least to an extension of the root portion.

(3) The legs extend radially inward of the packing, without being folded back at the bent portion toward the base (radially outward of the packing)

The above-described type of packing having the bent portion on its leg and performing a sealing function by utilizing elastic deformation of the bent portion has the following additional advantages, as compared to a type of packing performing a sealing function by utilizing compression deformation (e.g., O-ring). The distance between the frames and the peripheral portion of the battery plate-like member where the legs are arranged, which determines the amount of compression, may vary due to manufacturing tolerances and assembly errors of these members. With the packing having the bent portion on its leg, variation in contact pressure due to the difference in the amount of compression (the aforementioned distance variation) is smaller than that with an O-ring, thus attaining a stable contact pressure. Therefore, by setting the bend height of the bent portion to be sufficiently higher than a designed value of the distance, sealing capability can be ensured by the stable contact pressure even if the distance varies. In addition, since the manufacturing tolerances and assembly errors can be absorbed, the members can be designed with large manufacturing tolerances. Furthermore, during battery operation, for example, the battery plate-like member may move relative to the frames due to stress caused by the difference in thermal expansion coefficient between the frames and the battery plate-like member. With the packing having the bent portion on its leg, a stable contact pressure can be obtained regardless of the distance variation, thus reducing the possibility that the movement of the battery plate-like member is blocked. As a result, damage to the battery plate-like member due to the stress caused by the difference in thermal expansion coefficient can be suppressed. With the O-ring, in contrast, if the distance varies, the contact pressure varies greatly to be too small or too great. Thus, a stable contact pressure cannot be obtained. For this reason, if the O-ring is designed with a diameter (height) greater than a designed value of the distance in consideration of the manufacturing tolerances and assembly errors, an excessive contact pressure may be generated to cause damage to and deformation of the frames or the battery plate-like member. With the O-ring, moreover, since an excessive contact pressure may be generated by the distance variation, there is a risk that the movement of the battery plate-like member will be blocked, and the battery plate-like member will be damaged due to the stress caused by the difference in thermal expansion coefficient.

As such, by using the packing having the bent portion on its leg, the following advantageous effects can be expected. Namely, (1) a stable contact pressure can be obtained; (2) manufacturing tolerances and assembly errors of the frames and the battery plate-like member can be absorbed while the sealing capability is ensured; and (3) the generation of an excessive contact pressure can be suppressed to facilitate the movement of the battery plate-like member. In addition, since the manufacturing tolerances of the members can be increased, the costs of the battery sealing structure can be reduced. Moreover, since the risk of damage to the battery plate-like member is further reduced, a required strength of the battery plate-like member can be further reduced, and a wider range of options can be provided for a material for the battery plate-like member.

In one embodiment of the battery sealing structure of the present invention, the base of the packing includes a projection on at least one of front and rear surfaces facing the pair of frames.

The base is press-contacted between the pair of frames. According to this structure, since the base has the projection, the projection is squeezed and deformed by compression during the press-contact, thereby enhancing the sealing capability. More specifically, when the battery sealing structure is employed, the projection is deformed by compression to generate a contact pressure in a portion in contact with the frames, thereby producing a high sealing function. The dimensions of the base and the number of projections are not particularly limited but may be set as appropriate. If the battery sealing structure of the present invention is applied to the cell frame of the electrolyte circulation type battery (redox flow battery) described above, for example, the base has a thickness (distance from its front surface to its rear surface) of 0.5 mm to 1.2 mm and a width (distance from its inner periphery in contact with the outer edge of the battery plate-like member to its outer periphery) of 0.5 mm to 1.5 mm in a non-compressed state. Projections are provided at intervals in a circumferential direction of the annular packing One to three projections are provided on one surface of a leg, and they have a height of 0.1 mm to 0.5 mm in a non-compressed state. The amount of compression (rate of squeeze) of the projections determines a contact pressure. The higher the amount of compression, the higher the contact surface. By setting the height of the projections within the aforementioned range, a sufficient contact pressure can be ensured to enhance the sealing capability, and damage to and deformation of the frames due to the generation of an excessive contact surface can be suppressed. If a plurality of projections are provided, more contact portions with the frames are provided in a width direction of the base, thereby enhancing the reliability of the sealing capability. The projections of the base serve as ribs for reinforcing the packing (base), and also have a shape-retaining function.

Here, a projection may be provided on at least one of front and rear surfaces of the base, and may be provided on both or one of the surfaces. If a projection is provided on both the front and rear surfaces of the base, the projections may be provided in different positions between the front surface and the rear surface in the width direction of the base, or may be provided in the same positions in the width direction of the base.

An electrolyte circulation type battery cell frame of the present invention includes a battery plate-like member and a pair of frames for holding a peripheral portion of the battery plate-like member therebetween. The battery plate-like member is a bipolar plate. The electrolyte circulation type battery cell frame includes the battery sealing structure of the present invention described above.

This structure is easy to assemble by including the aforementioned battery sealing structure of the present invention, as described above. In addition, since the packing is made of an elastic material, the packing can alleviate stress concentration in a border portion between the frames and the bipolar plate to prevent damage to the frames or the bipolar plate, as described above. Therefore, a wide range of options for a material for the bipolar plate is provided without limitation. For example, a plate made of plastic carbon containing approximately 10% by mass to 50% by mass of graphite, plastic carbon containing a higher content of graphite (e.g., 60% by mass or higher), or carbon containing only graphite can be readily used for the bipolar plate.

An electrolyte circulation type battery cell stack of the present invention includes a stacked body including a plurality of cells stacked with cell frames interposed therebetween, each cell including a membrane, and a positive electrode and a negative electrode facing each other with the membrane interposed therebetween. The cell frame is the electrolyte circulation type battery cell frame of the present invention described above. The electrolyte circulation type battery cell stack includes a pair of end plates arranged on opposite ends of the stacked body, and a clamping mechanism for clamping both end plates in a stacking direction of the stacked body.

This structure is easy to assemble, and can prevent damage caused by the stress concentration in the border portion between the frames and the bipolar plate constituting the cell frame, by including the aforementioned cell frame of the present invention as its cell frame. In addition, by clamping the end plates with the clamping mechanism, the pair of frames constituting the cell frame can be pressed from the front and the rear.

An electrolyte circulation type battery of the present invention includes the electrolyte circulation type battery cell stack of the present invention described above.

This structure is easy to assemble by including the electrolyte circulation type battery cell stack of the present invention described above. In addition, since damage caused by the stress concentration in the border portion between the frames and the bipolar plate constituting the cell frame can be prevented, the battery can be operated stably when installed in an environment where operating conditions and storage conditions for the battery are drastically changed.

In one embodiment of the electrolyte circulation type battery of the present invention, the battery is a redox flow battery.

The redox flow battery is not particularly limited. For example, the positive and negative electrolytes satisfy one of the following conditions (1) and (2).

(1) Both the positive and negative electrolytes contain a vanadium ion.

(2) The positive electrolyte contains an iron ion, and the negative electrolyte contains at least one type of metal ion selected from a vanadium ion, a chromium ion, a zinc ion, and a tin ion.

Advantageous Effects of Invention

The battery sealing structure of the present invention is easy to assemble and can ensure high sealing capability, by using the annular packing made of an elastic material and having the pair of legs and the base connecting the legs together. Moreover, damage caused by the stress concentration in the border portion between the frames and the battery plate-like member can be prevented, to provide a wide range of options for a material for the battery plate-like member. Furthermore, the electrolyte circulation type battery cell frame, the electrolyte circulation type battery cell stack, and the electrolyte circulation type battery of the present invention are easy to assemble, can prevent damage caused by the stress concentration in the border portion between the frames and the bipolar plate, and can provide a wide range of options for a material for the bipolar plate, by including the battery sealing structure of the present invention described above.

DESCRIPTION OF EMBODIMENTS

Figure 1:
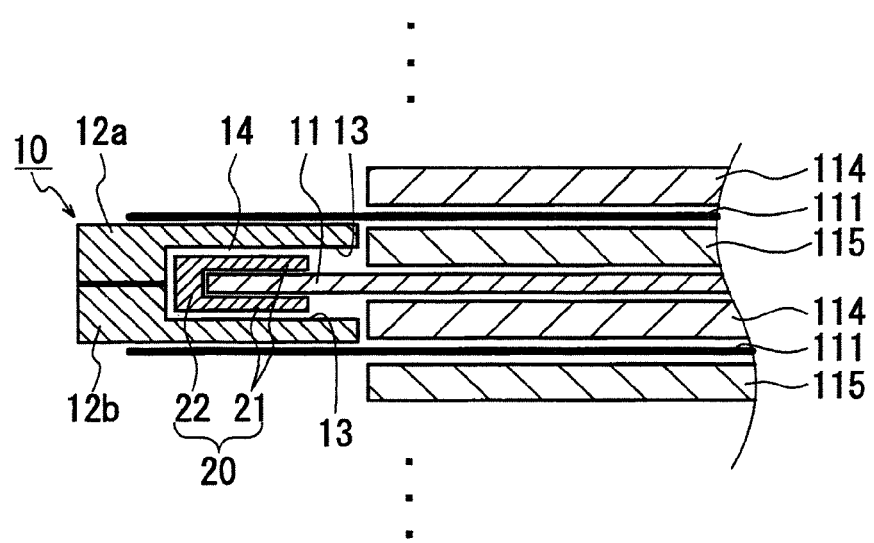
FIG. 1 is a schematic partially enlarged cross-sectional view for illustrating a cell stack including a cell frame according to a first embodiment.

The embodiments of the present invention will be described with reference to the drawings. In the embodiments described below, a cell frame of an electrolyte circulation type battery (redox flow battery) is described by way of example. In the drawings, the same characters refer to the same or corresponding parts.

(First Embodiment)

Figure 9:
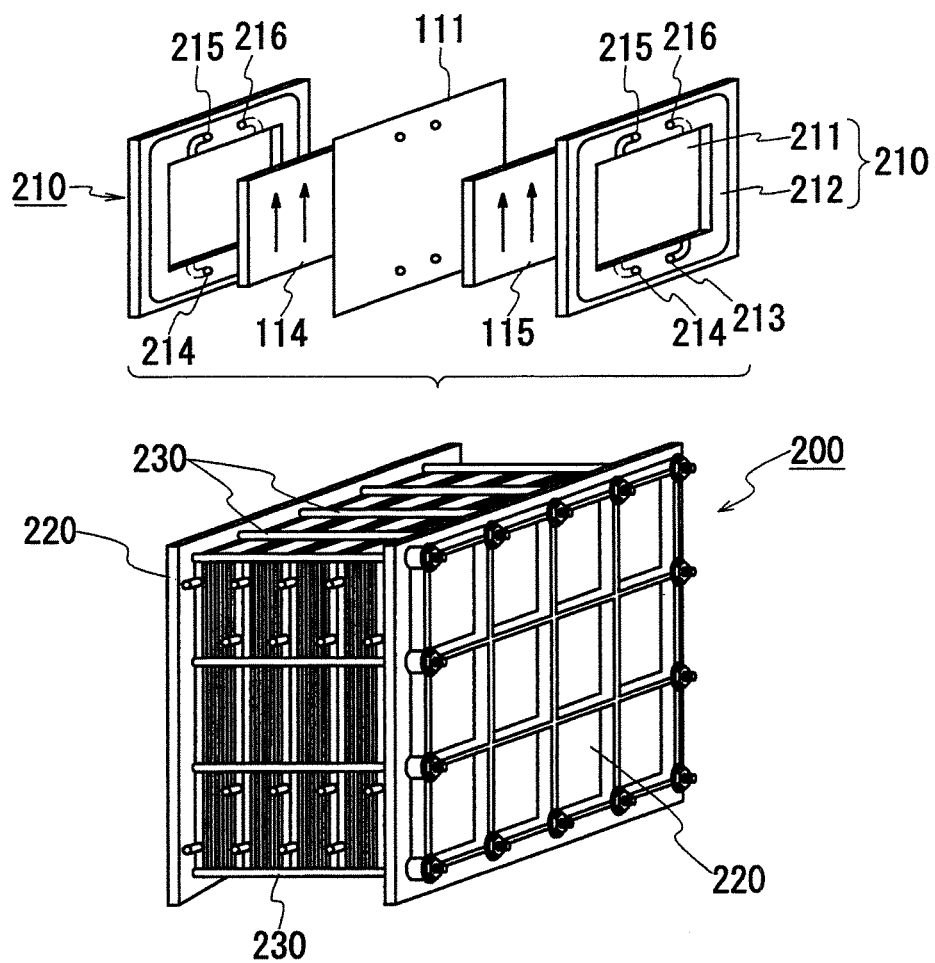
FIG. 9 is a schematic diagram for illustrating a cell stack.

FIG. 1 shows a cell stack including a cell frame 10 according to a first embodiment. This cell stack includes a plurality of cells stacked with cell frames 10 interposed therebetween, each cell including a membrane 111, and a positive electrode 114 and a negative electrode 115 facing each other with membrane 111 interposed therebetween. The structure of the cell stack is similar to that of cell stack 200 described with reference to FIG. 9 except for cell frame 10, and thus description thereof will not be repeated.

Cell frame 10 includes a battery plate-like member (bipolar plate) 11, a pair of frames 12a and 12b, and a packing 20. These components will be described below in detail.

Bipolar plate 11 has the shape of a rectangular plate, and is formed of a plastic carbon or carbon plate, for example. The thickness of the plate is set to 0.6 mm in this example.

Each of frames 12a and 12b has the shape of a rectangular frame, and is made of vinyl chloride, for example. In this example, frames 12a and 12b each have the same substantially L-shape in cross section, and are symmetrically arranged relative to bipolar plate 11. The cross section as used herein refers to a cross section orthogonal to a circumferential direction of frames 12a and 12b. Frames 12a and 12b hold a peripheral portion of bipolar plate 11 therebetween, and are pressed from the front and the rear (the upper side and the lower side in FIG. 1 are herein referred to as "front side" and "rear side," respectively). On each of respective surfaces of frames 12a and 12b facing each other in the pressing direction, a stepped surface 13 is formed to reduce the thickness of an inner peripheral portion, to form an annular groove 14 between the facing surfaces of frame 12a and frame 12b. The peripheral portion of bipolar plate 11 is accommodated in annular groove 14.

Packing 20 has a rectangular annular shape, and is made of an elastic material such as EPDM or fluorine-containing rubber. It is made of EPDM in this example. Packing 20 is fitted and mounted on the peripheral portion of bipolar plate 11, arranged in annular groove 14, and press-contacted between frames 12a, 12b and the peripheral portion of bipolar plate 11. Packing 20 includes a pair of legs 21 for holding the peripheral portion of bipolar plate 11 therebetween, and a base 22 connecting legs 21 together at an outer edge of bipolar plate 11. Each leg 21 includes an outer surface facing frame 12a (12b) and an inner surface facing bipolar plate 11, and base 22 includes a front surface facing frame 12a and a rear surface facing frame 12b. Legs 21 and base 22 are formed in one piece.

Figure 2:
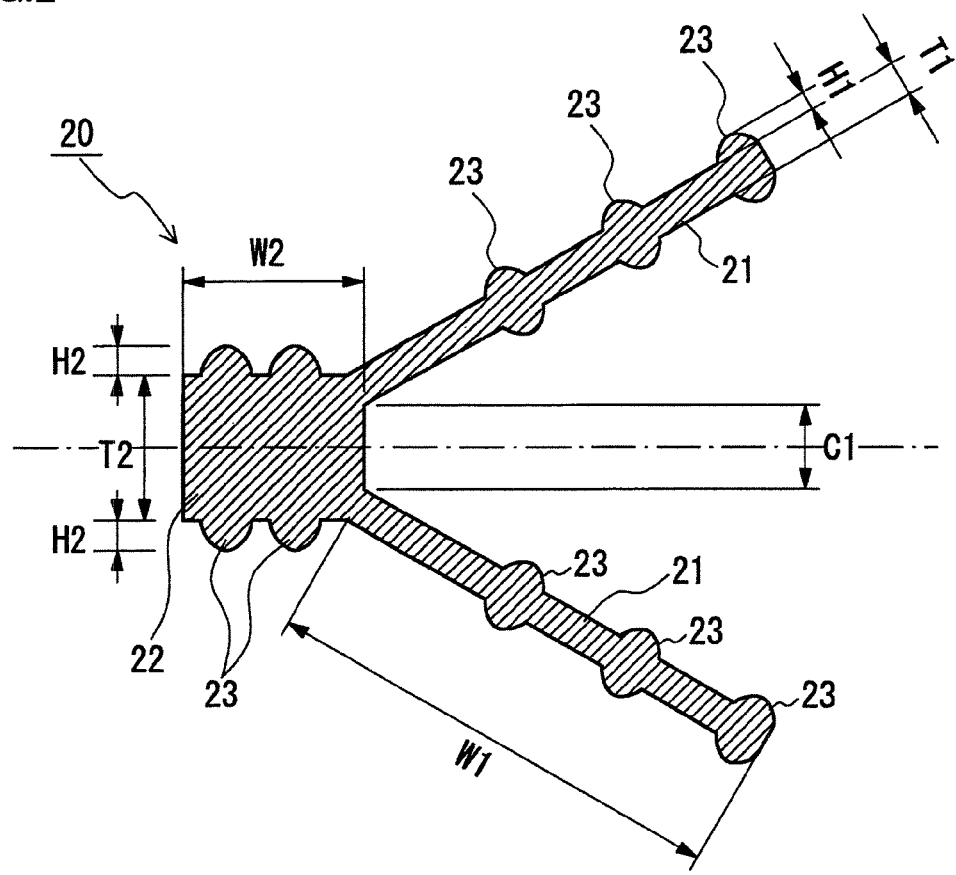
FIG. 2 is a schematic partially enlarged cross-sectional view for illustrating a packing used in the cell frame according to the first embodiment.

FIG. 2 shows the packing before the cell frame is assembled. As shown in FIG. 2, packing 20 has a substantially V-shape in cross section, and includes projections 23 provided on legs 21 and base 22. The cross section as used herein refers to a cross section orthogonal to a circumferential direction of packing 20. In this example, projections 23 are provided on both the outer surface and the inner surface of both legs 21, as well as on both the front surface and the rear surface of base 22. Three projections 23 are provided on each surface (the total of six projections on both surfaces) of each leg 21, and two projections 23 are provided on each surface (the total of four projections on both surfaces) of base 22. In both legs 21 and base 22, projections 23 are provided on both surfaces in the same positions in a width direction thereof. Projections 23 are provided in the same positions between both legs 21, and legs 21 have a symmetrical shape. Projections 23 of legs 21 and base 22 are formed at intervals along the circumferential direction of annular packing 20.

In this example, packing 20 is designed such that, when packing 20 is in a non-compressed state, each leg 21 has a thickness T1 of 0.3 mm, a width W1 of 3.0 mm, and a height H1 of 0.3 mm for projections 23 of leg 21, and base 22 has a thickness T2 of 1.0 mm, a width W2 of 1.0 mm, and a height H2 of 0.3 mm for projections 23 of base 22. In addition, a spacing C1 between roots of the pair of legs 21 extending from the inner periphery of base 22 is set to 0.6 mm.

Figure 3:
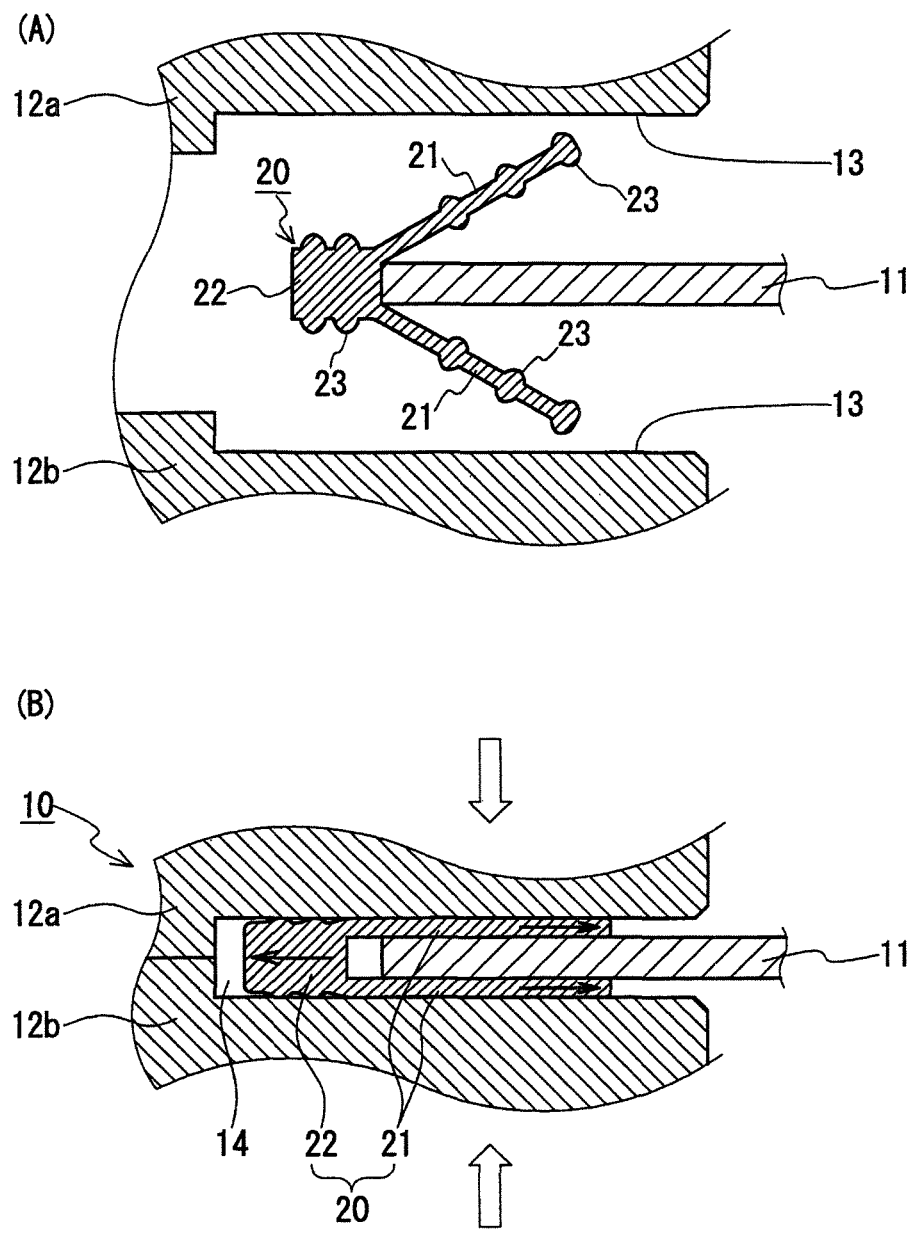
FIG. 3(A) is a schematic partially enlarged cross-sectional view for illustrating an assembling procedure of the cell frame according to the first embodiment, in a state before the assembly.
FIG. 3(B) is a schematic partially enlarged cross-sectional view for illustrating the assembling procedure of the cell frame according to the first embodiment, in a state after the assembly.

Next, an assembling procedure of cell frame 10 shown in FIG. 1 is described with reference to FIG. 3. First, the diameter of packing 20 is expanded to hold the peripheral portion of bipolar plate 11 between both legs 21, to mount packing 20 on the peripheral portion of bipolar plate 11 (see FIG. 3(A)). Then, the peripheral portion of bipolar plate 11 having packing 20 mounted thereon is held between the pair of frames 12a and 12b, and frames 12a and 12b are pressed from the front and the rear (see FIG. 3(B), where outline arrows indicate the pressing direction). Thus, packing 20 is deformed by being press-contacted between frames 12a, 12b and the peripheral portion of bipolar plate 11 to come in close contact with them, thus forming a battery sealing structure that seals a space between frames 12a and 12b (space where negative electrode 115 and positive electrode 114 are arranged with bipolar plate 11 interposed therebetween (see FIG. 1)). In addition, by providing projections 23 on legs 21 and base 22, projections 23 of legs 21 and base 22 are squeezed when packing 20 is press-contacted, thereby enhancing sealing capability.

In this example, the entire width of packing 20 is smaller than the width of stepped surfaces 13 of frames 12a and 12b (annular groove 14). When packing 20 is arranged in annular groove 14, an outer peripheral surface of base 22 does not come into contact with a bottom surface of annular groove 14, and the tips of legs 21 do not protrude from annular groove 14. Accordingly, even if legs 21 and base 22 are compressed and extended in a width direction (direction of black arrows in FIG. 3(B)) when packing 20 is press-contacted by pressing frames 12a and 12b in the direction of the outline arrows in FIG. 3(B), the extensions can be relieved into the space within annular groove 14. By ensuring such relief margin, abnormal deformation of packing 20 can be readily prevented even if a pressing load is increased.

The sealing structure of the cell frame according to the first embodiment described above can be made as a battery sealing structure that does not require adhesion operation, does not depend on the skills of an operator, and is thus easy to assemble. In addition, the packing is deformed by being press-contacted between the frames and the peripheral portion of the bipolar plate to come in close contact with them, thus ensuring high sealing capability. Moreover, by providing the projections on the legs or the base, the sealing capability can be enhanced. The projections of the legs or the base serve as ribs for reinforcing the packing, and also have a shape-retaining function. Furthermore, the packing can be mounted with easy operation of fitting the packing on the peripheral portion of the bipolar plate, and can be reliably mounted without being displaced or detached owing to the legs and the base.

Moreover, in this sealing structure, if the bipolar plate is deformed by expansion or contraction, the packing follows the bipolar plate and expands or contracts. Thus, the packing can alleviate stress concentration in a border portion between the frames and the bipolar plate, to prevent damage to the frames or the bipolar plate. Therefore, a wide range of options for a material for the bipolar plate is provided without limitation.

A cell stack including such cell frame, and an electrolyte circulation type battery (redox flow battery) including this cell stack are easy to assemble, and can prevent damage caused by the stress concentration in the border portion between the frames and the bipolar plate constituting the cell frame. Furthermore, this electrolyte circulation type battery (redox flow battery) can be operated stably when installed in an environment where operating conditions and the like for the battery are drastically changed.

(Second Embodiment)

In the first embodiment, the sealing structure of a cell frame using a packing having projections on its legs has been described with reference to FIGS. 1 to 3. In a second embodiment, the sealing structure of a cell frame using a packing having bent portions on its legs will be described with reference to FIGS. 4 to 6. The general structure of a cell stack (cell frame) and the basic structures of a bipolar plate, a pair of frames and a packing which are components of the cell frame in the second embodiment are similar to those in the first embodiment, and thus description thereof will not be repeated.

Figure 4:
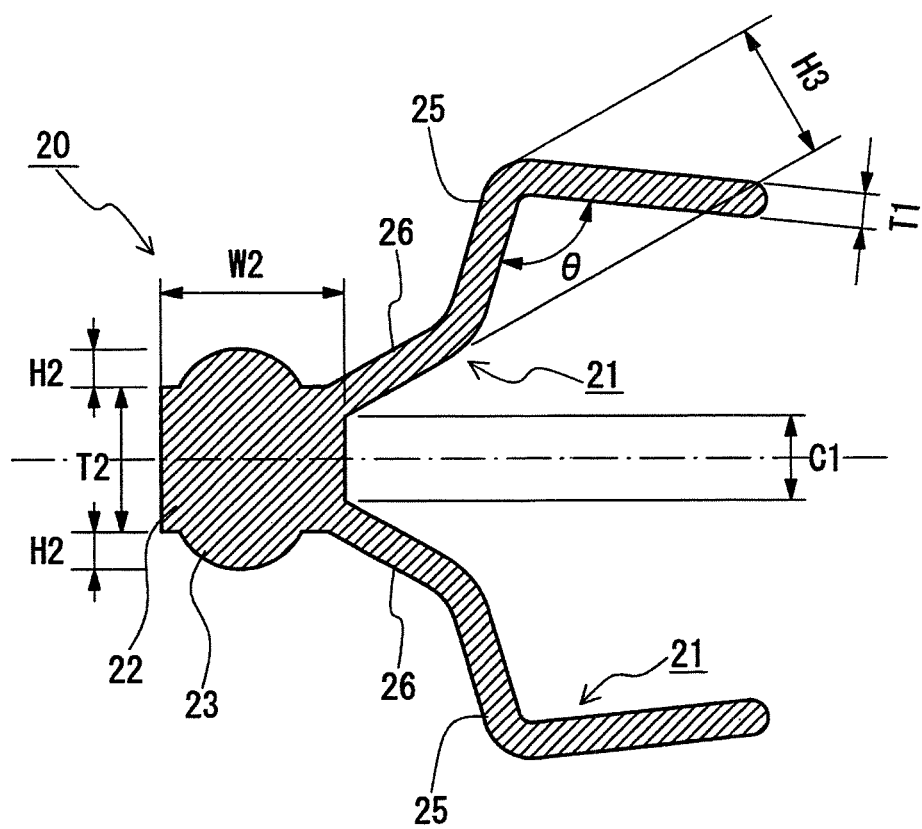
FIG. 4 is a schematic partially enlarged cross-sectional view for illustrating a packing used in a cell frame according to a second embodiment.

FIG. 4 shows the packing before the cell frame is assembled. As shown in FIG. 4, packing 20 has a substantially V-shape in cross section, and includes a bent portion 25 provided on each leg 21 and projections 23 provided on base 22. The cross section as used herein refers to a cross section orthogonal to a circumferential direction of packing 20. In this example, bent portion 25 is provided on each leg 21, and a root portion 26 extending linearly from base 22 is provided on each leg 21. Bent portion 25 is formed between root portion 26 and a tip. Legs 21 have a symmetrical shape. One bent portion 25 is provided on each leg 21 to have an outwardly convex shape relative to root portion 26. On the other hand, one projection 23 is provided on each surface (the total of two projections on both surfaces) of base 22. Base 22 is provided with projections 23 on both surfaces in the same position in a width direction thereof. Bent portions 25 of legs 21 and projections 23 of base 22 are formed at intervals along the circumferential direction of annular packing 20.

In this example, packing 20 is designed such that, when packing 20 is in a non-compressed state, each leg 21 has a thickness T1 of 0.3 mm, and a bend angle θ and a bend height H3 of 98° and 0.99 mm for bent portion 25, respectively, and base 22 has a thickness T2 of 1.0 mm, a width W2 of 1.0 mm, and a height H2 of 0.3 mm for projections 23. In addition, a spacing C1 between roots of the pair of legs 21 extending from the inner periphery of base 22 is set to 0.6 mm.

Figure 5:
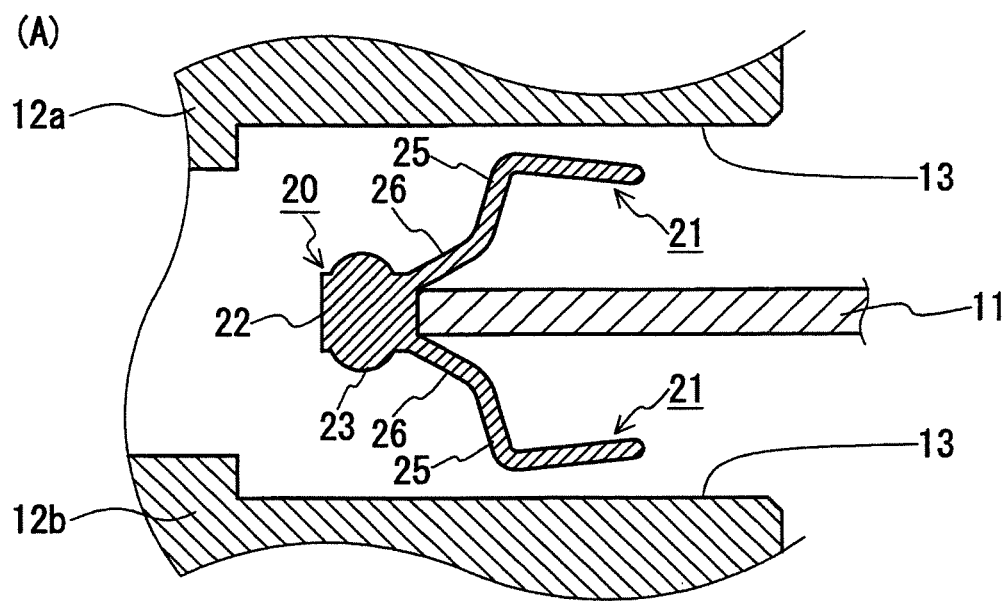
FIG. 5(A) is a schematic partially enlarged cross-sectional view for illustrating an assembling procedure of the cell frame according to the second embodiment, in a state before the assembly.
FIG. 5(B) is a schematic partially enlarged cross-sectional view for illustrating the assembling procedure of the cell frame according to the second embodiment, in a state after the assembly.
Figure 5:
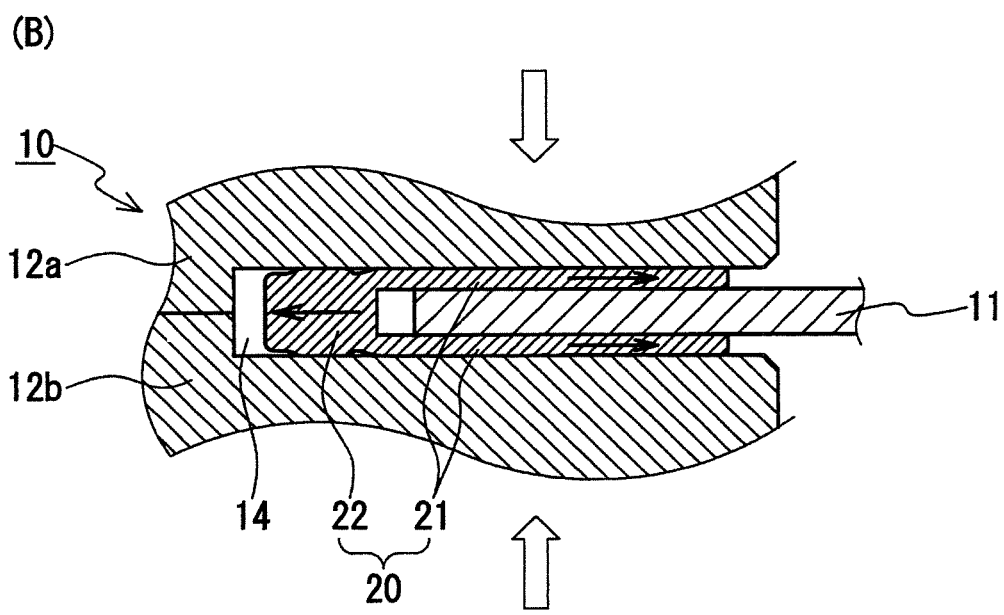

Next, an assembling procedure of the cell frame is described with reference to FIG. 5. First, the diameter of packing 20 is expanded to hold the peripheral portion of bipolar plate 11 between both legs 21, to mount packing 20 on the peripheral portion of bipolar plate 11 (see FIG. 5(A)). Then, the peripheral portion of bipolar plate 11 having packing 20 mounted thereon is held between the pair of frames 12a and 12b, and frames 12a and 12b are pressed from the front and the rear (see FIG. 5(B), where outline arrows indicate the pressing direction). Thus, packing 20 is deformed by being press-contacted between frames 12a, 12b and the peripheral portion of bipolar plate 11 to come in close contact with them, thus forming a battery sealing structure that seals a space between frames 12a and 12b (space where negative electrode 115 and positive electrode 114 are arranged with bipolar plate 11 interposed therebetween (see FIG. 1)). In addition, by providing bent portions 25 on legs 21 and projections 23 on base 22, bent potions 25 of legs 21 are elastically deformed into a linear, flat shape and projections 23 of base 22 are squeezed and deformed by compression when packing 20 is press-contacted, thereby enhancing sealing capability.

In this example, as in the first embodiment, the entire width of packing 20 is smaller than the width of stepped surfaces 13 of frames 12a and 12b (annular groove 14). When packing 20 is arranged in annular groove 14, an outer peripheral surface of base 22 does not come into contact with a bottom surface of annular groove 14, and the tips of legs 21 do not protrude from annular groove 14. Accordingly, even if legs 21 and base 22 are compressed and extended in a width direction (direction of black arrows in FIG. 5(B)) when packing 20 is press-contacted by pressing frames 12a and 12b in the direction of the outline arrows in FIG. 5(B), the extensions can be relieved into the space within annular groove 14. By ensuring such relief margin, abnormal deformation of packing 20 can be readily prevented even if a pressing load is increased.

Figure 6:
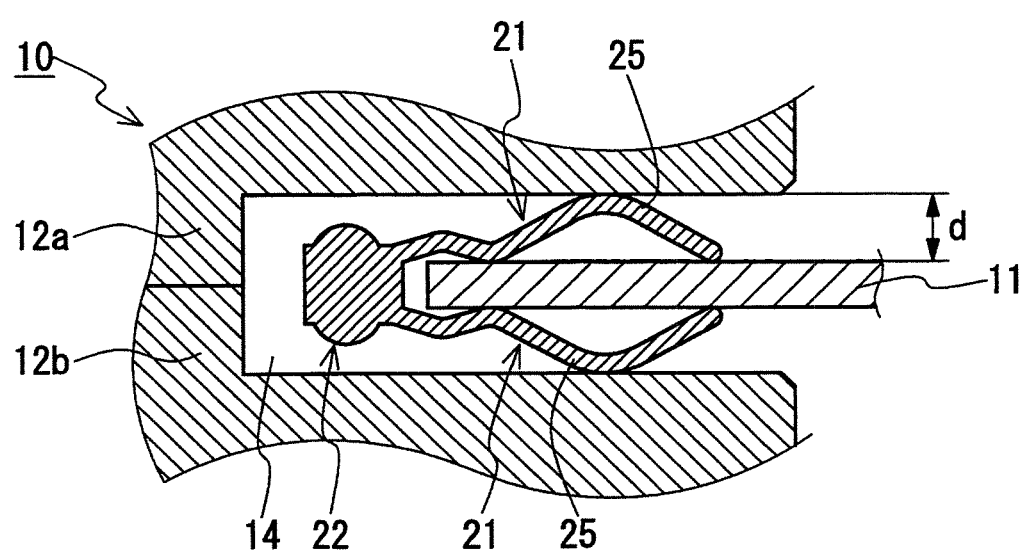
FIG. 6 is a schematic partially enlarged cross-sectional view for illustrating an example of the state after the assembly of the cell frame according to the second embodiment.

The sealing structure of the cell frame according to the second embodiment described above can provide effects similar to those of the sealing structure of the cell frame according to the first embodiment, and can provide the following additional effect. With packing 20 having bent portions 25 on legs 21, variation in contact pressure due to the difference in the amount of compression is small, thus attaining a stable contact pressure. For example, as shown in FIG. 6, it is assumed that the obtained value of a distance d between frame 12a (12b) and the peripheral portion of bipolar plate 11 where leg 21 of packing 20 is arranged is larger than a designed value due to manufacturing tolerances and assembly errors of frame 12a (12b) or bipolar plate 11. As a specific example, it is assumed that an actual distance d is 0.8 mm due to manufacturing tolerances and the like, relative to a designed value of 0.3 mm of distance d. Here, by setting the height of bent portions 25 to be greater than the designed value of distance d (e.g., 0.9 mm or greater), as shown in FIG. 6, a contact pressure is generated in portions in contact with frame 12a (12b) and bipolar plate 11 due to the elastic deformation of bent portions 25, thereby producing a sealing function.

Table 1 shows relation between the aforementioned distance d and the contact pressure in the sealing structure of the cell frame according to the second embodiment (Test Example 1). For comparison purposes, Table 1 also shows relation between distance d and the contact pressure in a sealing structure having an O-ring arranged between the frames and the peripheral portion of the bipolar plate (Comparative Example 1). In Table 1, each contact pressure is represented in value relative to a contact pressure of 1 when distance d=0.3 in Test Example 1. The bent portions had a thickness of 0.25 mm in Test Example 1, and the O-ring had a diameter of 0.55 mm in Comparative Example 1.

TABLE 1

| Distance d (mm) | 0.25 | 0.3 | 0.5 | 0.55 | 0.8 |
|---|---|---|---|---|---|
| Test Example 1 | 1.5 | 1 | 0.6 | 0.6 | 0.5 |
| Comparative Example 1 | 40 | 19 | 1.1 | 0 | 0 |

It can be seen from the results in Table 1 that variation in contact pressure with variation in distance d is small in Test Example 1 where the packing having the bent portions on the legs was used as compared to Comparative Example 1 where the O-ring was used, thus attaining a stable contact pressure. Specifically, in Test Example 1, an increase rate of the contact pressure is about 50% when distance d is 0.25 mm, and a decrease rate of the contact pressure is about 50% when distance d is 0.8 mm. As such, the generation of an excessive contact pressure can be suppressed with a decrease in distance d, while a certain contact pressure can be ensured with an increase in distance d. Thus, even if distance d varies to some degree, sealing capability can be ensured by the stable contact pressure. In addition, since the manufacturing tolerances and assembly errors can be absorbed, the members can be designed with large manufacturing tolerances. In contrast, in Comparative Example 1, the contact pressure increases significantly with a decrease in distance d. Thus, an excessive contact pressure may be generated, causing damage to or deformation of the frames or the bipolar plate. When distance d is 0.55 mm (diameter of the O-ring) or greater, on the other hand, the contact pressure becomes zero and sealing capability is not provided. Namely, in Comparative Example 1, the variation in contact pressure with the variation in distance d is great, and distance d needs to be precisely controlled.

Furthermore, in Test Example 1, since the generation of an excessive contact pressure with the variation in distance d can be suppressed, when stress is generated due to the difference in thermal expansion coefficient between the frames and the bipolar plate during battery operation, for example, the bipolar plate can readily move relative to the frames. Therefore, damage to the bipolar plate due to the stress resulting from the difference in thermal expansion coefficient can be readily prevented. In Comparative Example 1, on the other hand, since an excessive contact pressure may be generated, the movement of the bipolar plate is prevented, and the bipolar plate may be damaged due to the stress resulting from the difference in thermal expansion coefficient. As such, in Test Example 1, the risk of damage to the bipolar plate is further reduced, thereby further reducing the required strength of the bipolar plate and providing a wider range of options for a material for the bipolar plate.

(First Variation)

In cell frame 10 according to the embodiments described above, the pair of frames 12a and 12b have been described as having the same shape with stepped surface 13 and as being symmetrically arranged. Alternatively, the pair of frames may have shapes different from each other.

Figure 7:
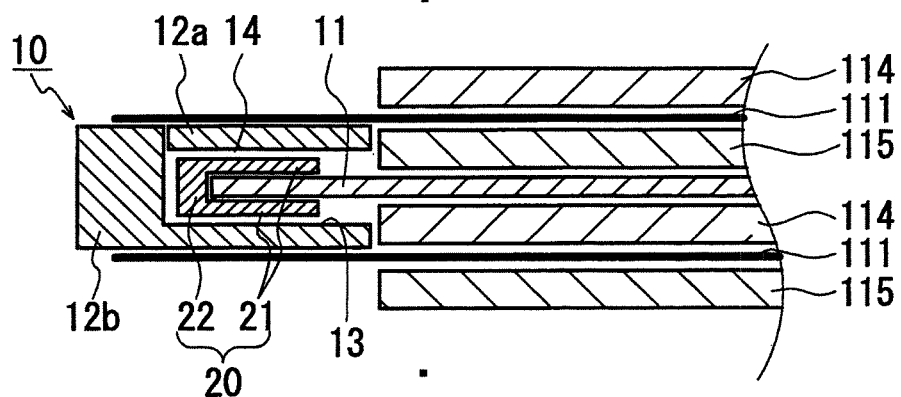
FIG. 7(A) is a schematic partially enlarged cross-sectional view for illustrating a variation of frames.
FIG. 7(B) is a schematic partially enlarged cross-sectional view for illustrating another variation of the frames.
Figure 7:
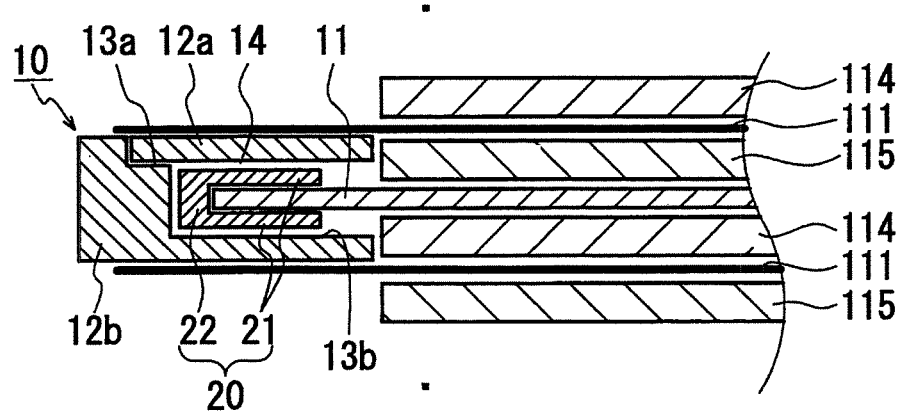
Figure 8:
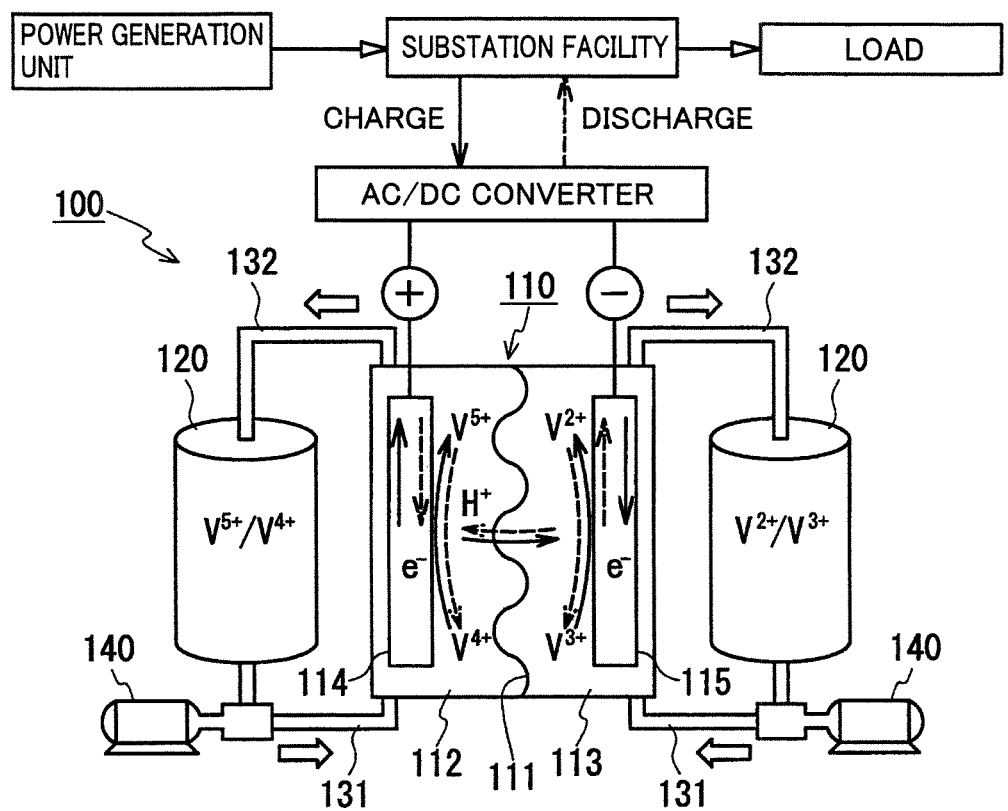
FIG. 8 is a schematic diagram for illustrating a redox flow battery.

In a pair of frames 12a and 12b shown in FIG. 7(A), one frame 12a has the shape of a plate frame, and has a flat surface facing frame 12b. The other frame 12b has a substantially L-shape in cross section, and is provided with stepped surface 13 on a surface facing frame 12a to reduce the thickness of an inner peripheral portion. In addition, the width of frame 12a is substantially equal to the width of stepped surface 13 of frame 12b. Annular groove 14 is formed between the facing surfaces of frame 12a and frame 12b. The peripheral portion of bipolar plate 11 having packing 20 mounted thereon is accommodated in annular groove 14.

In a pair of frames 12a and 12b shown in FIG. 7(B), one frame 12a has the shape of a plate frame, and has a flat surface facing frame 12b. The other frame 12b has a substantially L-shape in cross section, and is provided with a first stepped surface 13a and a second stepped surface 13b on a surface facing frame 12a to reduce the thickness in stages from the outer periphery toward the inner periphery. In addition, the width of frame 12a is substantially equal to a combined width of first and second stepped surfaces 13a and 13b of frame 12b, with frame 12a partially abutting on first stepped surface 13 of frame 12b. Annular groove 14 is formed between the facing surfaces of frame 12a and frame 12b. The peripheral portion of bipolar plate 11 having packing 20 mounted thereon is accommodated in annular groove 14.

It is noted that the present invention is not limited to the embodiments described above, and can be modified as appropriate without departing from the substance of the present invention. For example, the materials for the bipolar plate, the frame and the packing which constitute the cell frame can be modified as appropriate. Moreover, the dimensions of the legs and the base of the packing, and the number and positions of projections provided on the legs or the base may be modified as appropriate.

Industrial Applicability

The battery sealing structure of the present invention can be utilized as a sealing structure of various types of batteries such as an electrolyte circulation type battery (redox flow battery) and a fuel cell. This battery sealing structure can be suitably utilized for an electrolyte circulation type battery cell frame, an electrolyte circulation type battery cell stack, and an electrolyte circulation type battery. The electrolyte circulation type battery of the present invention can be suitably utilized as a large-capacity storage battery for load leveling and output stabilization.

Reference Signs List 10 cell frame; 11 battery plate-like member (bipolar plate); 12a, 12b frame; 13 stepped surface; 13a first stepped surface; 13b second stepped surface; 14 annular groove; 20 packing; 21 leg; 22 base; 23 projection; 25 bent portion; 26 root portion; 100 electrolyte circulation type battery (redox flow battery); 110 cell; 111 membrane; 112 positive electrode cell; 113 negative electrode cell; 114 positive electrode; 115 negative electrode; 120 electrolyte tank; 130 circulation path; 131 go conduit pipe; 132 return conduit pipe; 140 circulation pump; 200 cell stack; 210 cell frame; 211 bipolar plate; 212 frame; 213, 214 liquid supply manifold; 215, 216 liquid discharge manifold; 220 end plate; 230 clamping mechanism.

The invention claimed is:

1. A redox flow battery sealing structure, comprising a battery plate-like member and a pair of frames for holding a peripheral portion of said battery plate-like member therebetween, for sealing a space between said frames, said pair of frames being pressed from the front and the rear, said pair of frames being provided with an annular groove between respective surfaces of said frames facing each other in a pressing direction, for accommodating the peripheral portion of said battery plate-like member, said redox flow battery sealing structure comprising an annular packing made of an elastic material, said packing being arranged in said annular groove and press-contacted between said pair of frames and the peripheral portion of said battery plate-like member, said packing including a pair of legs for holding the peripheral portion of said battery plate-like member therebetween, and a base connecting the legs together at an outer edge of said battery plate-like member.

2. The redox flow battery sealing structure according to claim 1, wherein at least one of said legs of said packing includes a projection on one or both of an outer surface facing said frames and an inner surface facing said battery plate-like member.

3. The redox flow battery sealing structure according to claim 1, wherein, prior to said packing being press-contacted at least one of said legs of said packing includes a root portion extending linearly from said base, and at least one bent portion formed between this root portion and a tip.

4. The redox flow battery sealing structure according to claim 1, wherein said base of said packing includes a projection on at least one of front and rear surfaces facing said pair of frames.

5. A redox flow battery cell frame, comprising a battery plate-like member and a pair of frames for holding a peripheral portion of said battery plate-like member therebetween, said battery plate-like member being a bipolar plate, said redox flow battery cell frame comprising the redox flow battery sealing structure according to claim 1.

6. A redox flow battery cell stack, comprising a stacked body including a plurality of cells stacked with cell frames interposed therebetween, each cell including a membrane, and a positive electrode and a negative electrode facing each other with the membrane interposed therebetween, said cell frame being the redox flow battery cell frame according to claim 5, said redox flow battery cell stack comprising:

a pair of end plates arranged on opposite ends of said stacked body; and a clamping mechanism for clamping both of said end plates in a stacking direction of said stacked body.

7. A redox flow battery, comprising the redox flow battery cell stack according to claim 6.

* * * * *